July 23, 1963  L. A. MORTIER  3,098,623
CARRIAGE FOR HANDLING AND DISPLACING CABLE REELS
Filed March 19, 1962  15 Sheets-Sheet 1

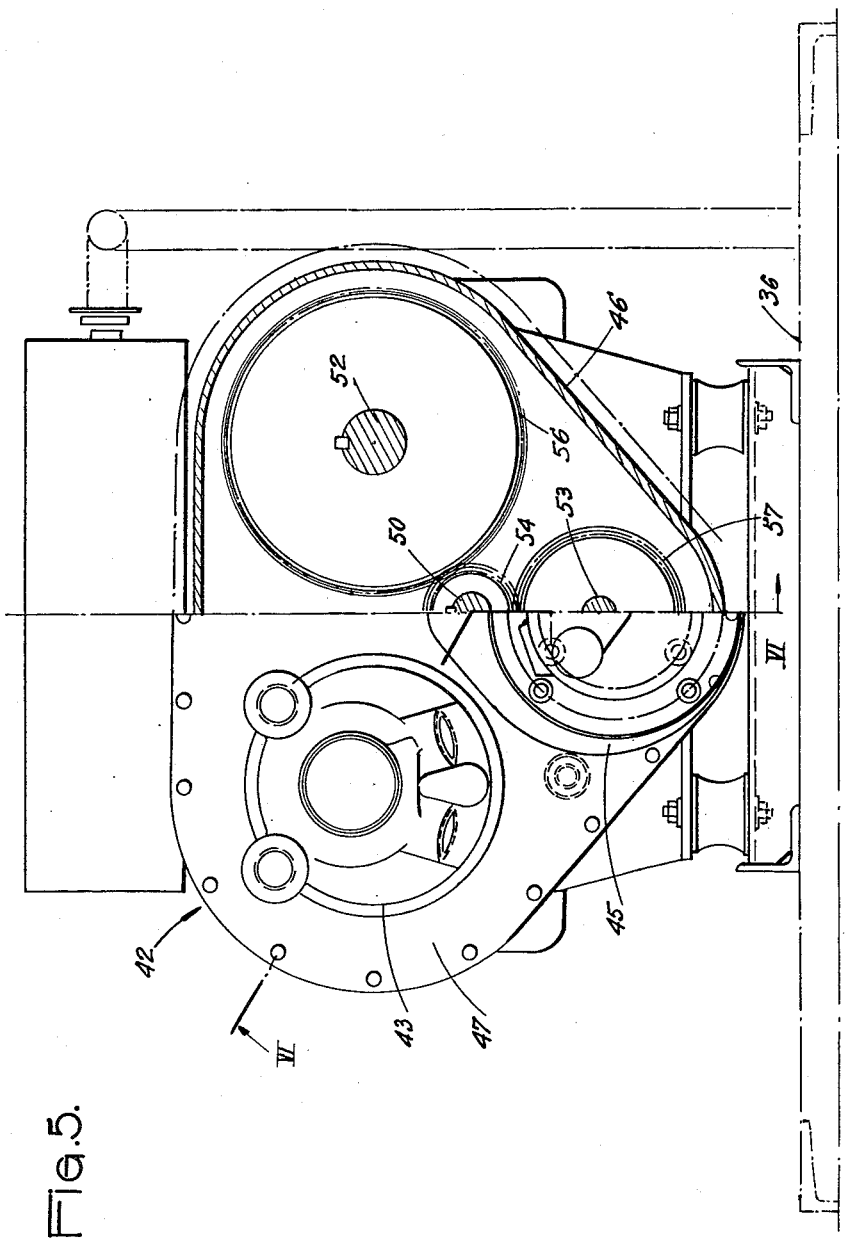

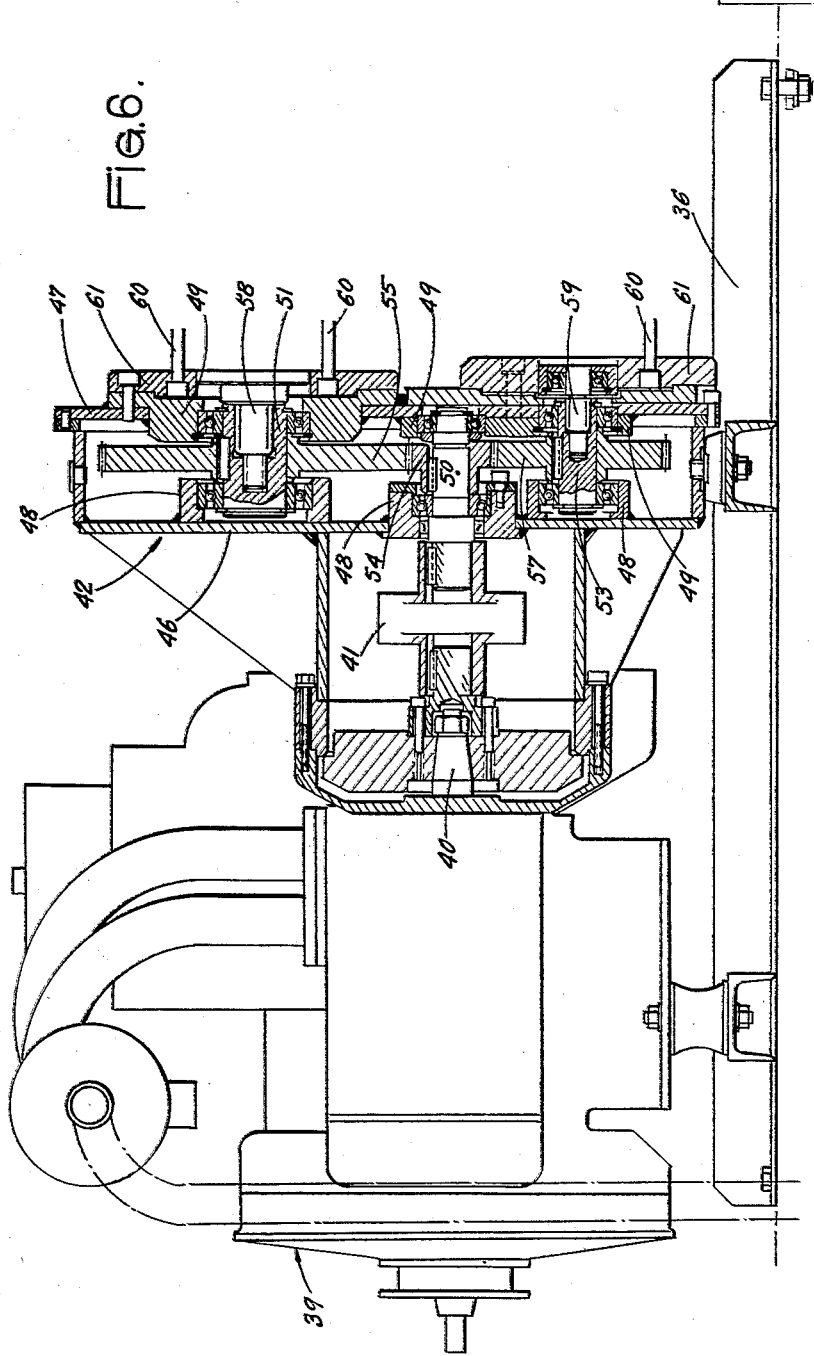

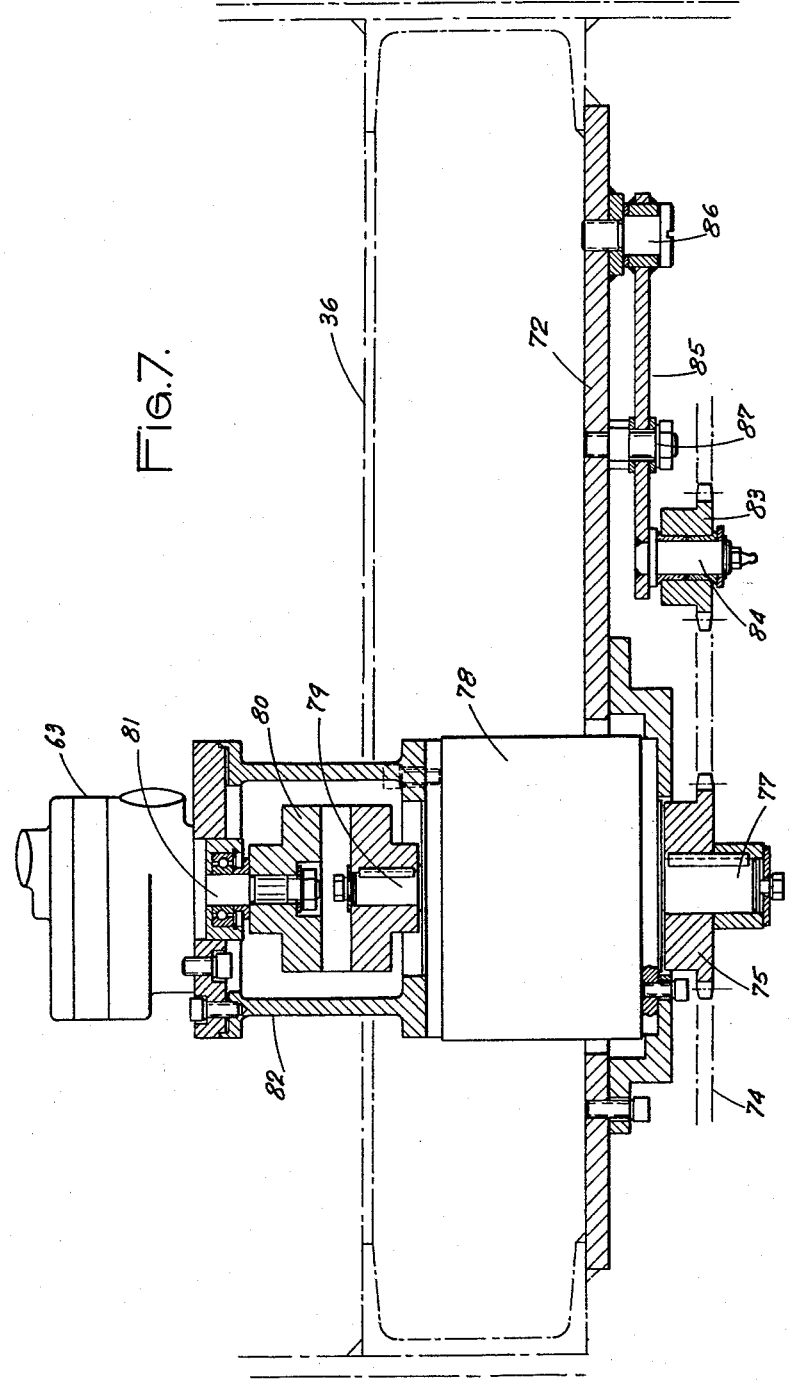

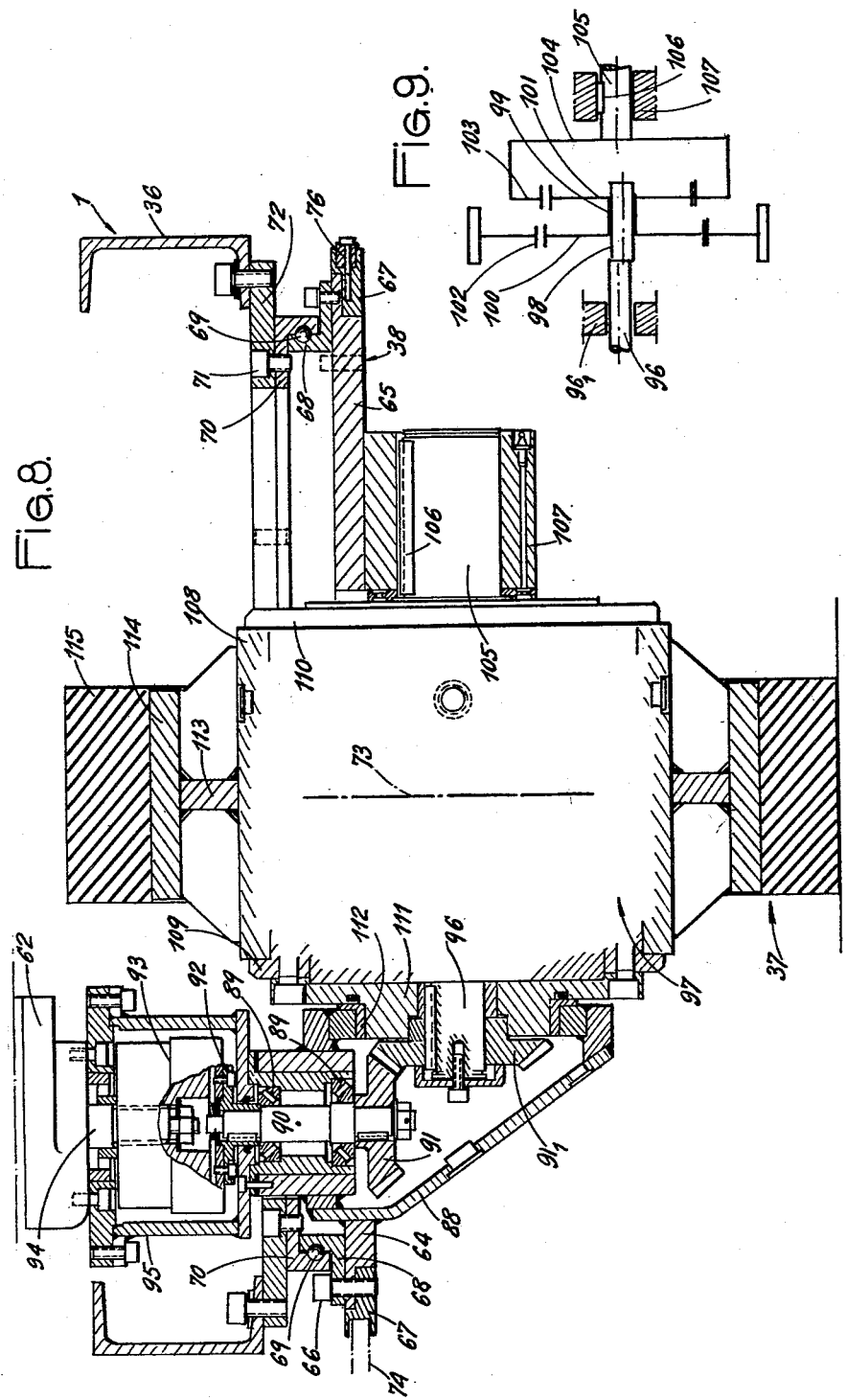

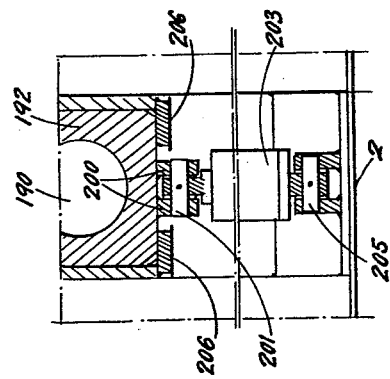
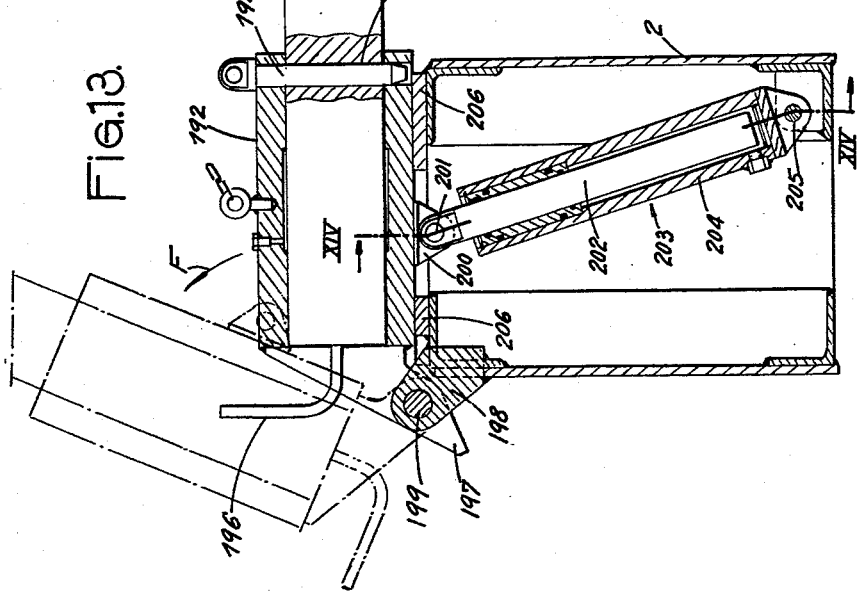

3,098,623
CARRIAGE FOR HANDLING AND DISPLACING CABLE REELS
Lucien André Mortier, 16bis Rue de Strasbourg, Asnieres, France
Filed Mar. 19, 1962, Ser. No. 180,735
Claims priority, application France Mar. 20, 1961
15 Claims. (Cl. 242—86.5)

In general, large capacity telephone or electric cable reels are moved up as close as possible to the work site, on a trailer coupled to a traction vehicle or on a platform of a lorry. They are then unloaded by being rolled down inclined ramps, in the process of which they are restrained by means of a winch the cable of which is attached to a bar extending through the reel hub. All the subsequent operations are carried out manually: the reels are moved up to the work site by being rolled along the ground, while the cable is payed off either by rolling the reel and then sliding it, or by rotating it in a fixed support.

This invention overcomes this drawback, as well as others stemming from it, i.e. the large number of handling personnel required, duration of work on and occupation of the work site, high cost of laying operations, occupational hazards, etc., by providing a fully automatic cable reel handling and displacing carriage which is controlled by a single operator, characterized in that it comprises a U-shaped chassis, the cross-member of which is associated to a swivelling steering platform supported by a driving wheel and the side members of which, disposed on either side of a cable reel to be transported and unrolled, are each supported by a wheel loosely mounted in a pivotal fork which is subjected to the action of a stabilizing member tending to move away the chassis against which it normally abuts, the side members of the chassis being provided, on the one hand, with two freely rotatable front lateral rollers which are retractable and adjustable in position and, on the other hand, with two rear lateral rollers that are integral with a shaft which is guided in the chassis and which co-operates with a translation mechanism and with a rotary motor which respectively tends to cause the reel, the rims of which are in contact with said rollers, to be either raised or lowered, or rotated.

The description which follows of a specific embodiment of the invention, given with reference to the accompanying drawings, which are filed by way of example only and not of limitation, will give a clear understanding of the invention and disclose other particularities thereof.

Referring to the drawings filed herewith:

FIGURE 5 is a large scale detail view, in partial section and corresponding to FIGURE 4, of a component part of the carriage.

FIGURE 6 is an interrupted sectional view through the line VI—VI of FIGURE 5.

FIGURES 7 and 8 are detail sectional views of other component parts appearing on a smaller scale on FIGURE 3.

FIGURE 9 is a kinematic diagram of a transmission unit illustrated on FIGURE 8.

FIGURE 13 is a larger scale section through the line XIII—XIII of FIGURE 2.

FIGURE 14 is a section taken through the line XIV—XIV of FIGURE 13.

FIGURES 1 to 4 clearly show the whole of the carriage according to the invention. Such a carriage comprises a very rigid U-shaped chassis 1 the side members 2 and 3 of which provide between them a gap 4, the width of which is sufficient to accommodate the telephone or electric cable reel to be handled and, in particular, to accommodate the largest reels extant. In the specific embodiment illustrated by way of example but not of limitation, the chassis is constructed from steel plates and extrusions which are welded together to form a box-type structure.

Figure 1:
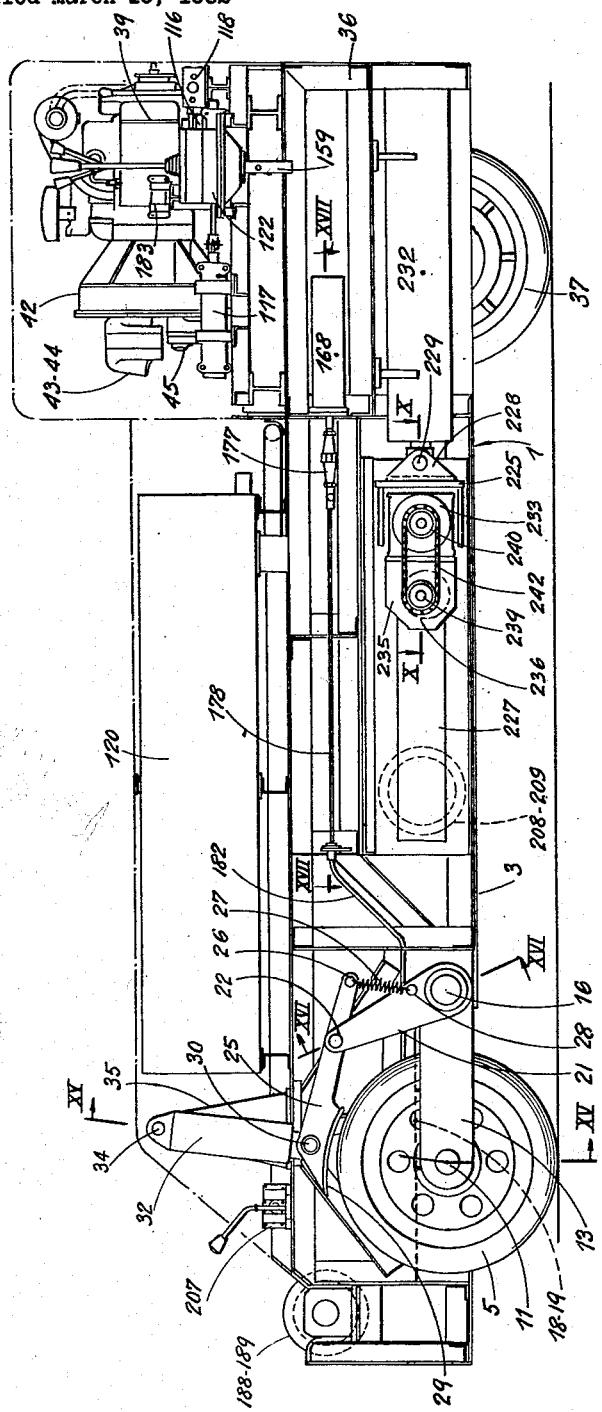
FIGURE 1 is a side elevation view of a cable reel handling and displacing carriage in accordance with the invention, certain components of the carriage having been removed in order to reveal a number of other components which are normally hidden.
Figure 16:
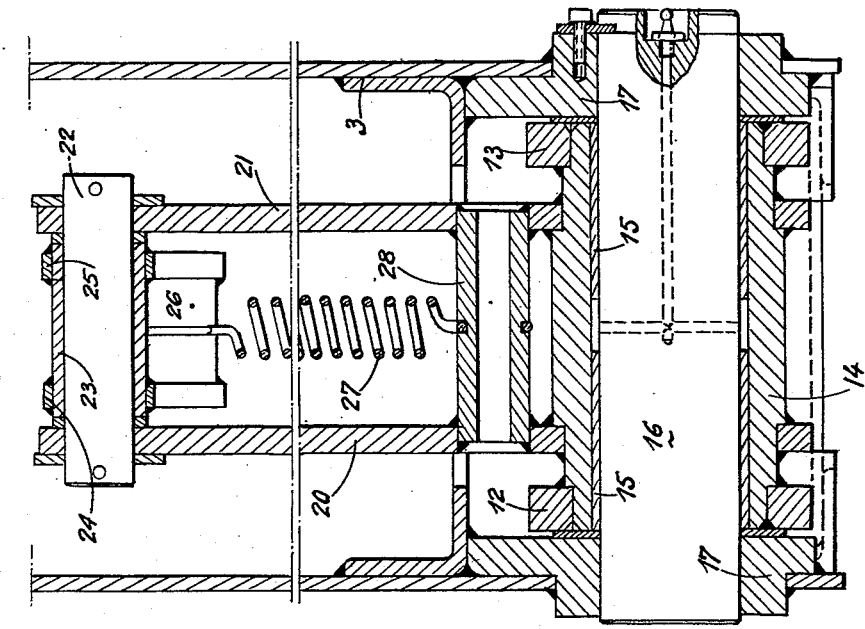
FIGURES 15, 16 and 17 are larger scale fragmentary sections taken through the lines XV—XV, XVI—XVI and XVII—XVII, respectively, of FIGURE 1.
Figure 10:
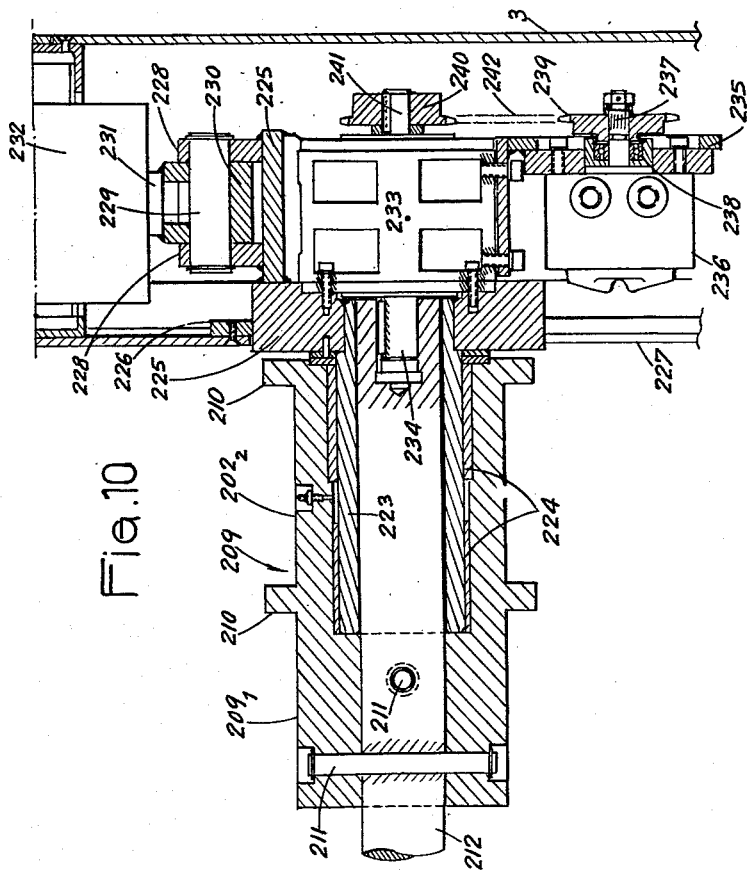
FIGURES 10 and 11 are larger scale sectional views, taken through the line X—X of FIGURE 1, of each side of the carriage.
Figures 11, 12:
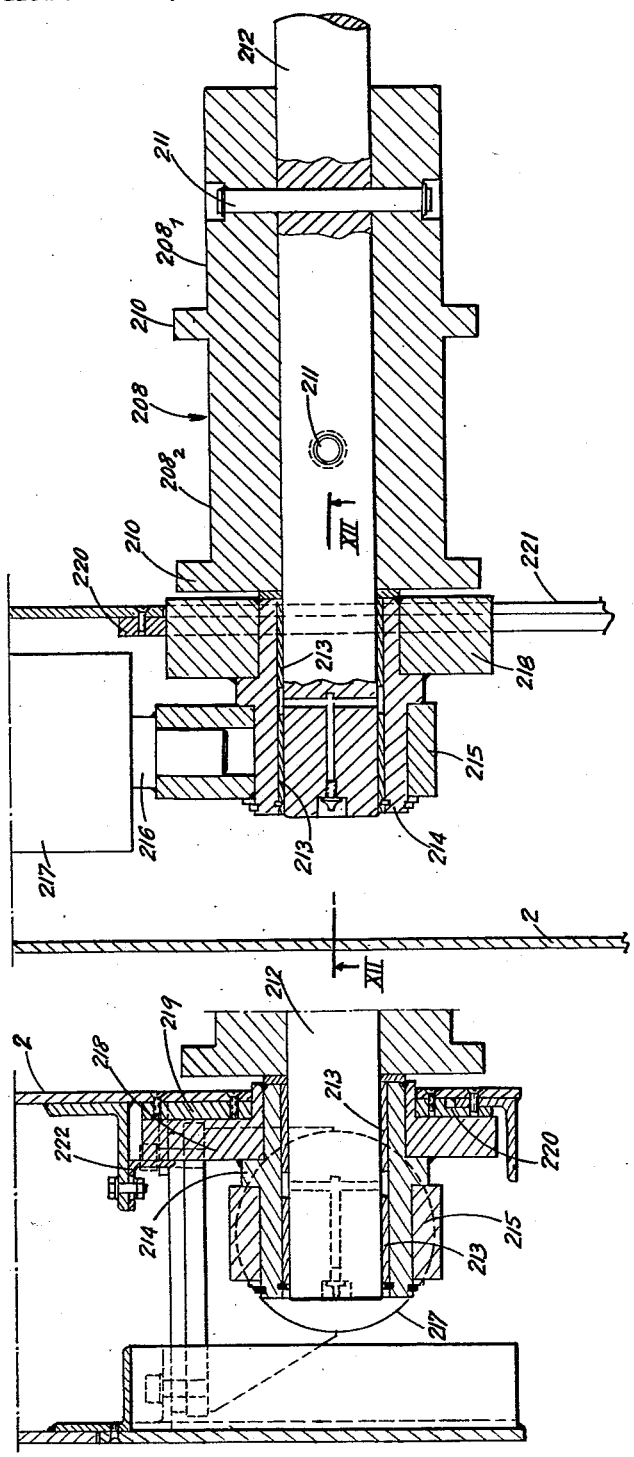
FIGURE 12 is a section through the line XII—XII of FIGURE 11.
Figure 15:
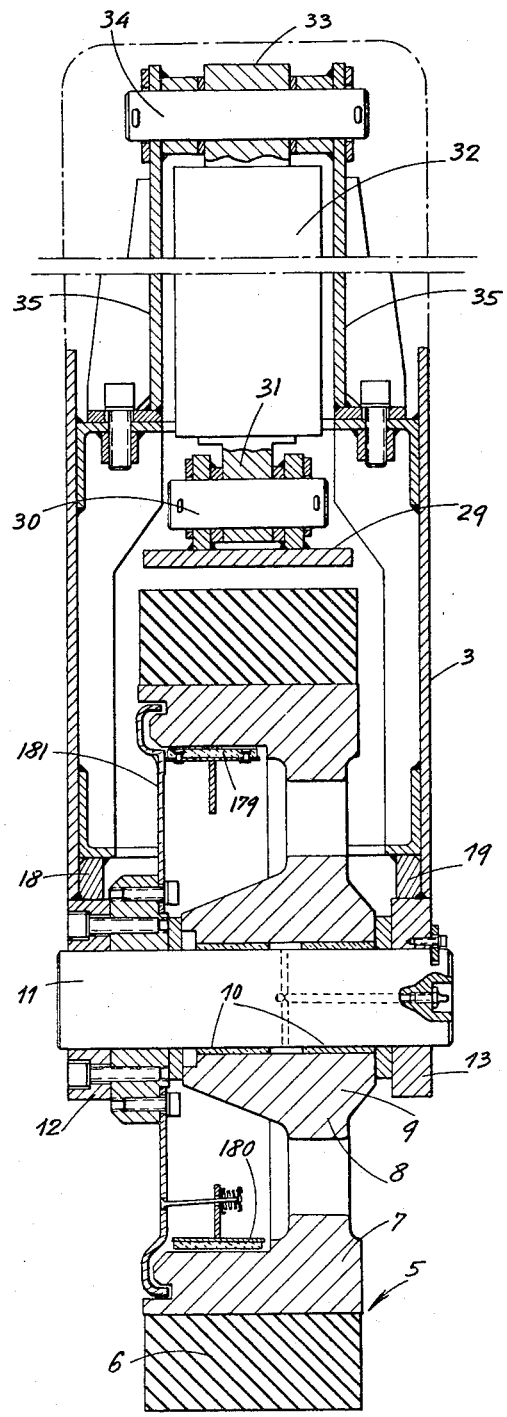

The chassis members 2 and 3 are each supported by a wheel 5 fitted with a hard-rubber solid tyre 6 mounted on a rim 7 which is connected through a thick flange 8 to a hub 9, which hub is in turn mounted freely rotatable, through the medium of bearings 10, on an axle 11 (see FIGURES 1, 15 and 16). The axle 11 is fixed into two arms 12 and 13 of which the other extremities are rigid with a sleeve 14 provided with bearings 15 which rotate about an axle 16 rigidly secured to bosses 17 in the corresponding member 2 (or 3) of the chassis, which chassis comprises stops 18 and 19 adapted to restrain the arms 12 and 13, opposite which said stops are located. The sleeve 14 is likewise rigid with two countermotion cranks 20, 21 which are interposed between the arms 12, 13 and form therewith an acute angle which is nearly a right angle. The free ends of the cranks are pivotally connected to a shaft 22 which extends through a tubular shaft 23 to provide substantially mid-way cross-bracing for two levers 24, 25 which are interconnected at one end by a tube 26. A spring 27 is fastened across the tube 26 and a further tube 28 secured to the cranks 20, 21. The other ends of levers 24, 25 are rigid with an arcuate shoe 29 disposed above the tyre 6 of the corresponding wheel, and said levers 24, 25 are pivoted about an axle 30 engaged into an eye 31 which forms an extension of the piston rod associated to a jack 32 the cylinder of which is likewise provided with an eye 33 threaded over an axle 34 which extends through supports 35 fitted to member 2 (or 3) associated thereto of the chassis 1.

The jack 32 is adapted to apply the shoe 29 against the tyre 6, by causing the levers 24, 25 to pivot against the countering action of the return spring 27. As it pursues its stroke, the jack then tends to raise the corresponding side of the chassis 1 since it causes a pivoting about the axle 16 of the arms 12, 13, against which the stops 18, 19 of said chassis normally abut. For this reason, the jacks 32 associated to the two side wheels 5 are hereinafter referred to as "stabilizing jacks" since they enable the chassis to be brought horizontal on rough terrain, at least in the transverse direction.

A cross member 36 of chassis 1 is supported by a middle wheel 37 which is mounted, in the manner hereinafter described, on a swivelling platform 38 fitted beneath said cross member (see FIGURES 1 to 3 and 5 to 9). The cross member supports a motor-pump unit comprising an internal combustion engine 39 the power shaft 40 of which drives, through the medium of an elastic coupling 41 and a transmission box 42, three pumps 43, 44 and 45, which may be of the gear type, for instance. From FIGURES 5 and 6, it can be seen that the transmission box comprises a casing 46 secured to the engine support 39 and closed by a cover 47. The casing and the transmission box cover are provided with ball bearings 48 and 49 respectively, adapted to support a central drive shaft 50 cottered to one of the plates of the elastic coupling 41, and three peripheral driven shafts 51, 52 and 53 respectively. The drive shaft 50 is rigid with a pinion 54 meshing with three gearwheels 55, 56, 57 keyed to driven shafts 51 to 53. The said driven shafts are coupled, through the medium of splines, to the input shafts 58 of pumps 43 and 44, followed by the input shaft 59 of pump 45. The pumps are fixed by screws 60 to base rings 61 fitted to the bearings 49 in the cover 47.

It will be noted that the gearwheels 55 and 56 are larger than the gearwheel 57, as the pumps 43 and 44 and subsequently 45, which they drive, have different capacities (pressure and output). Indeed, as will be disclosed hereinafter, the pumps 43 and 44 are adapted to supply a hydraulic motor 62 (see FIGURE 8) which displaces the carriage in one direction or the other, at different speeds, whereas the pump 45 is adapted to supply a hydraulic motor 63 (see FIGURE 7) providing steering motion for the carriage, in addition to other hydraulic appurtenances for controlling various functions.

The swivelling platform 38 comprises two half-plates 64, 65, which are secured by screws 66 between an annular block 67 and an inner race 68, which race is part of a circular rolling track 69, the outer race 70 of which track is fitted to and retained by screws 71 beneath a plate 72 forming part of the cross member 36 of chassis 1 (see FIGURE 8). In the specific example illustrated, the rolling track 69 consists of a large-diameter, deep-grooved, ball-type thrust bearing. The platform 65 is thus freely rotatable about a vertical axle 73, but this rotation is controlled by means of an endless chain 74 meshing over a control sprocket 75 and over the block 67, to which block one link of the chain is secured by a clamp 76. The sprocket 75 is keyed to and retained on an output shaft 77 of a reduction gear unit 78 (of the epicyclic type, for instance) supported by the plate 72 (see FIGURE 7). The input shaft 79 of reduction gear unit 78 is connected through an elastic coupling 80 to the output shaft 81 of the rotary hydraulic motor 63, the casing of which is rigidly united with that of said reduction gear unit by means of a cross-bracing structure 82. The endless chain 74 also runs over a take-up pulley 83 mounted loosely on an axle 84 projecting from the free end of an arm 85 which is pivotally mounted on a pin 86 affixed to the plate 72 and which is subjected to locking means 87 tending to immobilize it in all positions.

The half-plate 64 of platform 38 is integral with a box structure 88 which, through the instrumentality of roller bearings 89, supports a vertical countershaft 90 one end of which is keyed to a bevel gear 91 and the other end to the driven plate 92 of a torque limiting means 93 (of the friction type, say) the driven plate of which is coupled to the output shaft 94 of the rotary hydraulic motor 62 (see FIGURE 8). The motor 62 is secured on a sealed casing 95 which encloses the torque limiter 93 and which is itself affixed to the structure 88.

The bevel pinion 91 meshes with a further bevel pinion $91_1$ which is rigidly connected, by any convenient means, to the input shaft 96 of a reduction gear unit 97 consisting preferably of epicyclic gears the kinematic train of which is illustrated by the diagram in FIGURE 9. The shaft 96, namely the high speed input shaft is extended by a cylindrical section 98 which is slightly offset to constitute a gear train supporting shaft upon which is mounted freely rotatable a sleeve 99 for coupling to two planet gears 100 and 101 in constant mesh with two internal sun ring-gears 102 and 103. The reduction ratio provided by this box is increased as the relative difference between the number of teeth in the corresponding planet gears and sun gears, respectively is reduced. In the specific application illustrated, the gear train supporting shaft 96, 98 is the driving shaft, while the sun ring-gear 102 is driven and the sun ring-gear 103 stationary. The sun ring-gear 103 is accordingly cut into an annular periphery of a disc 104 upon which is embodied, coaxially with the shaft 96, a projecting shaft 105 which is cottered by a key 106 within a boss formed on a part 107 rigid with the half-plate 65; the sun ring-gear 102 is cut or fitted into a hub 108 of the wheel 37, which hub constitutes a casing enclosed by means of two covers 109, 110 for the reduction gear unit 97; lastly, the gear train supporting shaft 96, 98 is supported in bearings $96_1$ provided in the said casing.

A flange 111, which is centered upon and fixed to the cover 109, is mounted freely rotatable within a bearing 112, which is accommodated in the structure 88 concentrically with the shafts 96 and 105, which shafts are aligned. Thus, through the medium of the torque limiting means 93, the shaft 90, and the pinions 91, $91_1$, the motor 62 rotates the high speed input shaft 96 in one direction or the other, which shaft 96, through the medium of the epicyclic gear train, transmits its power to the hub 108 with a very large reduction in speed and a torque consequently increased in the inverse ratio. The hub 108 of wheel 37 is connected through a thick ribbed flange 113 to a rim 114 fitted with a hard rubber solid tyre 115.

As a result, the wheel 37 is supported by a fork formed by the structure 88 and the boss 107, which are integral with the perforated platform 38; it is furthermore driven round its horizontal axle by the hydraulic motor 62, to enable the carriage to be moved forwards or backwards; lastly, it is able to swivel about the vertical axle 73, in response to the hydraulic motor 63 which drives the said platform 38 to permit steering the carriage.

Figure 2:
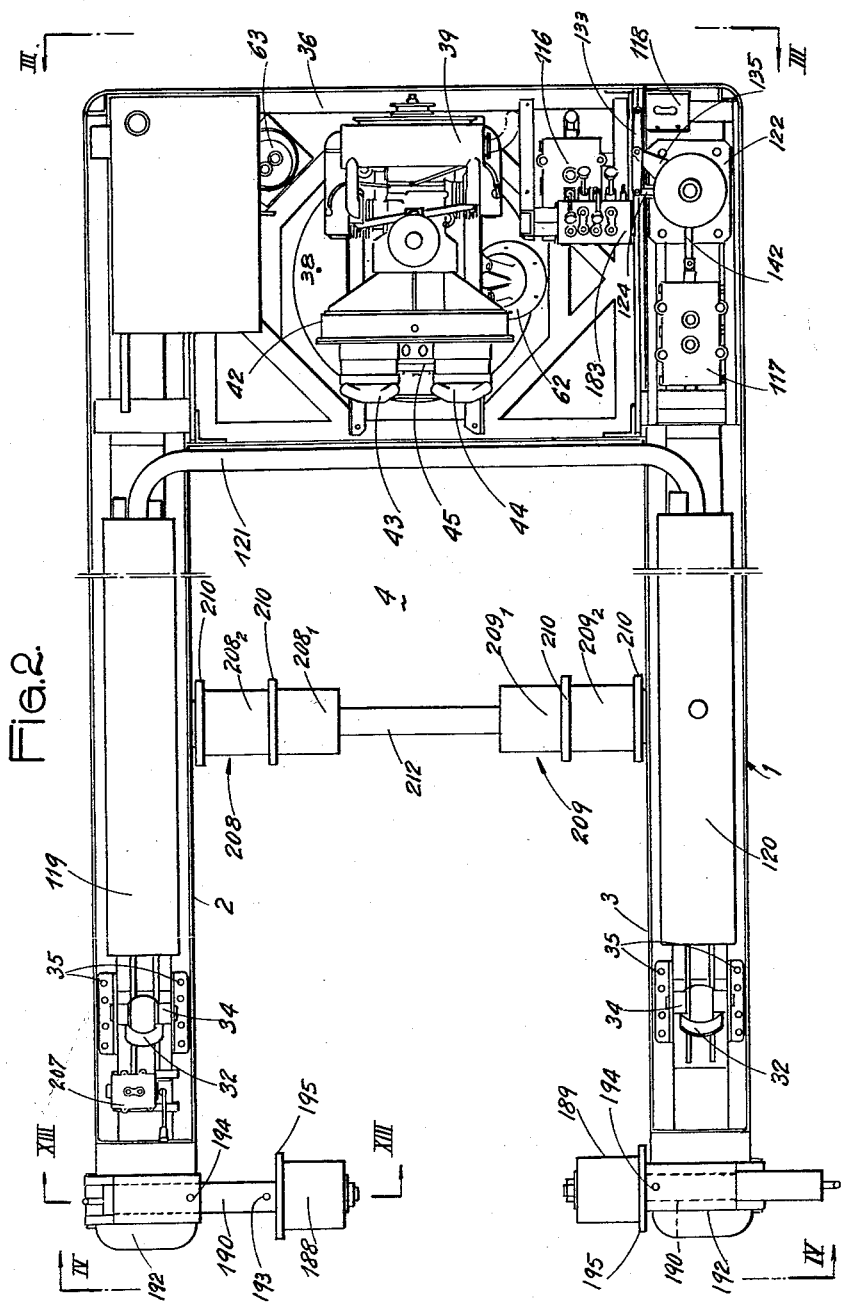
FIGURE 2 is a plan view of the carriage, as seen from above.
Figure 3:
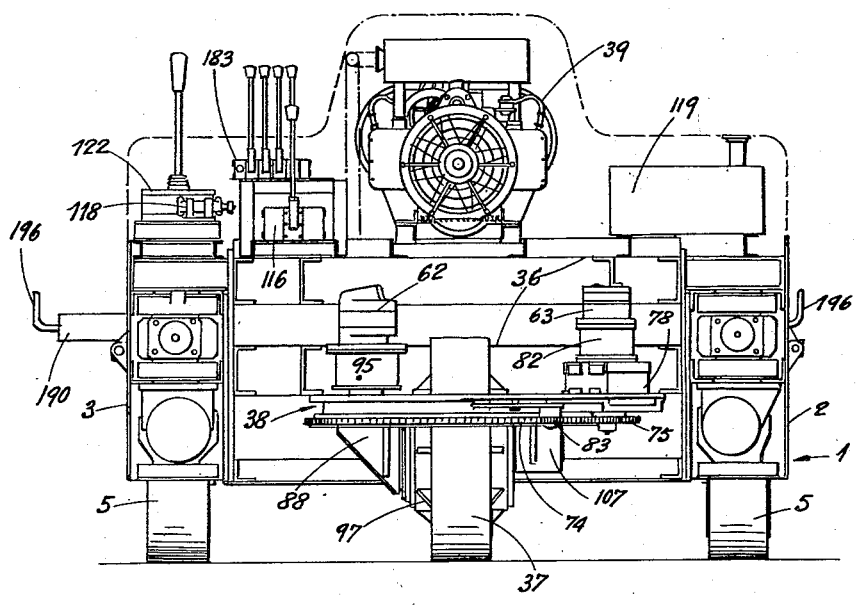
FIGURE 3 is an end elevation view taken through the line III—III of FIGURE 2.
Figure 4:
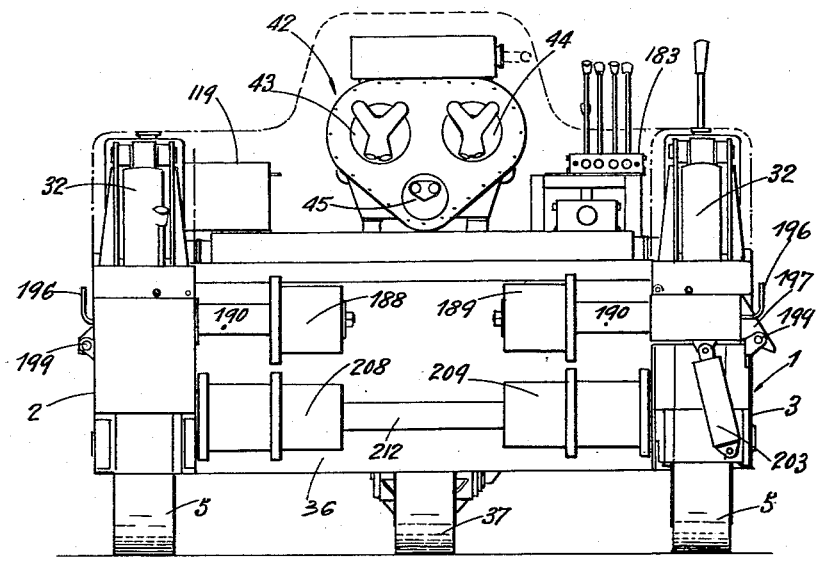
FIGURE 4 is an end elevation view through the line IV—IV of FIGURE 2.

The supply to the rotary traction hydraulic motor 62 is regulated by a distributor 116 for the selection of the appropriate speed, and by a distributor 117 for the selection of forward or reverse, while the supply to the steering rotary hydraulic motor 63 is regulated by a distributor 118 for selecting turns to the right or to the left (FIGURE 2). As will be seen from the hydraulic circuitry diagram of FIGURE 20, the suction pipes of the pumps 43, 44 and 45 are connected through lines 43a, 44a and 45a to a tank 119. The delivery pipe of pump 43 is connected through lines 43b, 43c to the input of a forward or reverse selecting distributor 117, and the delivery pipe of pump 44 is connected through a line 44b to the input of a speed selecting distributor 116 the two outputs from which are connected through a conduit 44c to the line 43c and through a conduit 44d to a delivery tank 120. Two taps off the distributor 117 are respectively connected through lines 62a and 62b to the inlet and outlet pipes or vice versa, of the traction hydraulic motor 62. The output from distributor 117 is connected through a conduit 62c to the delivery tank 120. The said tank 120 communicates, through a transfer tube 121, with the suction tank 119, both of said tanks 119, 120 being of very large capacity (FIGURE 2).

In one of its two positions, the distributor 116 establishes communication between the line 44b and the conduit 44d to enable the pump 44 to feed into the delivery tank. This position corresponds to the lower of the two carriage speeds, since the hydraulic motor 42 can be supplied only by the pump 43. In its other position, the distributor 116 establishes communication between the line 44b and the conduit 44c. This second position corresponds to the higher of the two carriage speeds, wherein the hydraulic motor 62 is supplied by both pumps 43 and 44.

The hydraulic fluid issuing from the pump 43 or the pumps 43 and 44 penetrates through the line 43c into the distributor 117. The said distributor 117 is adapted to occupy one of three positions, a first position wherein the line 43c is connected to the conduit 62c debouching into the delivery tank 120, as a result of which the carriage remains stationary since the motor 62 is not supplied; a second position wherein the line 43c is connected to the line 62a, to supply the motor 62, and the line 62b to the conduit 62c to convey the fluid delivered into the tank 120, as a result of which the carriage is driven forward at the speed selected by the distributor 116, i.e. at slow or high speed according as the pump 43 alone or both pumps 43 and 44 are feeding into the motor; a third position wherein the line 43c communicates with the line 62b and the line 62a is connected to the conduit 62c, as a result of which the carriage is driven in reverse at the chosen speed.

The delivery pipe of pump 45 is connected through a line 45a to the input of a steering distributor 118 the output of which is connected through a conduit 45b to the delivery tank 120. Two taps off this distributor are respectively connected through lines 63a and 63b to the inlet and outlet pipes, or vice versa, of the steering hydraulic motor 63. The distributor 118 is adapted to occupy either of three positions: a first position wherein the line 45a communicates with the line 63a to supply the motor 63 and the line 63b communicates with the conduit 45b to discharge the hydraulic fluid into the tank 120, as a result of which the carriage turns to the right, for example; a second position wherein the line 45a communicates with the line 63b and the line 63a with the conduit 45b, as a result of which the carriage turns to the left; and a third position wherein the lines 63a and 63b are short-circuited and the line 45a communicates with the conduit 45b to cause the pump 45 to deliver into the tank 120, as a result of which the steering wheel 37 remains in the position it occupied, i.e. turned to the right or to the left or directed straight ahead.

Figure 18:
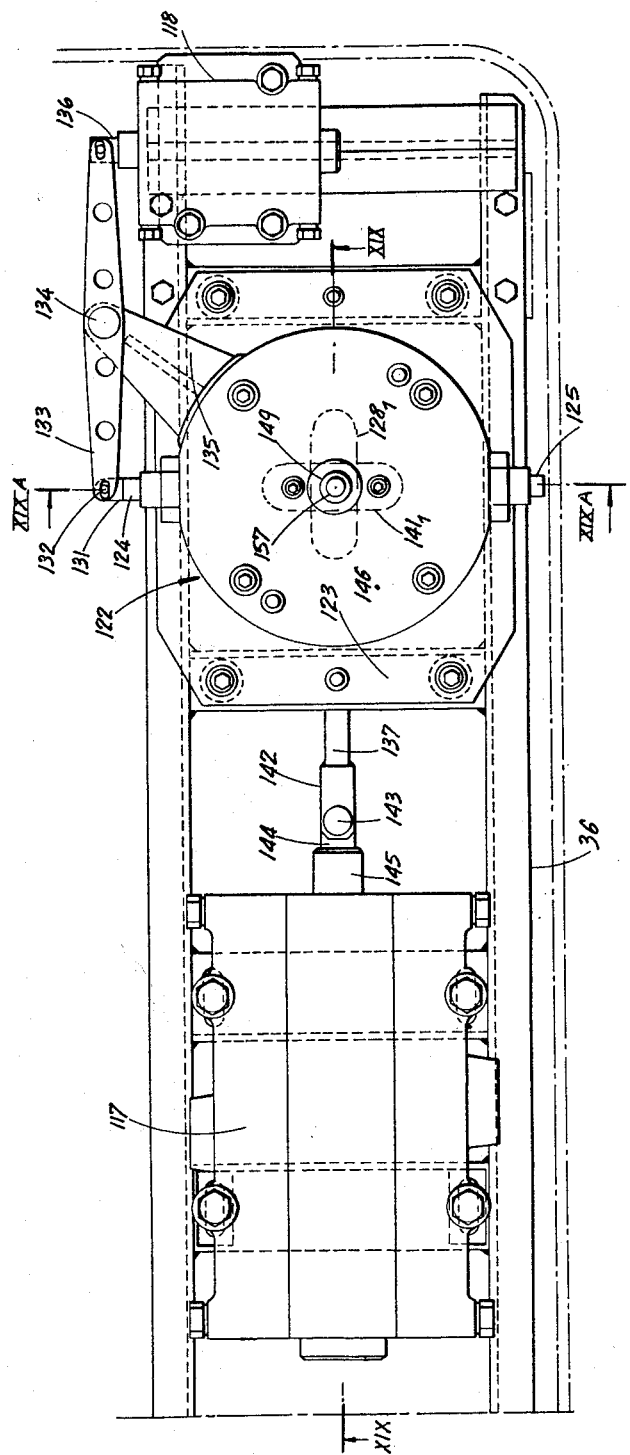
FIGURE 18 is an enlarged detail plan view of a further component part of the carriage shown on FIGURE 2.
Figure 19:
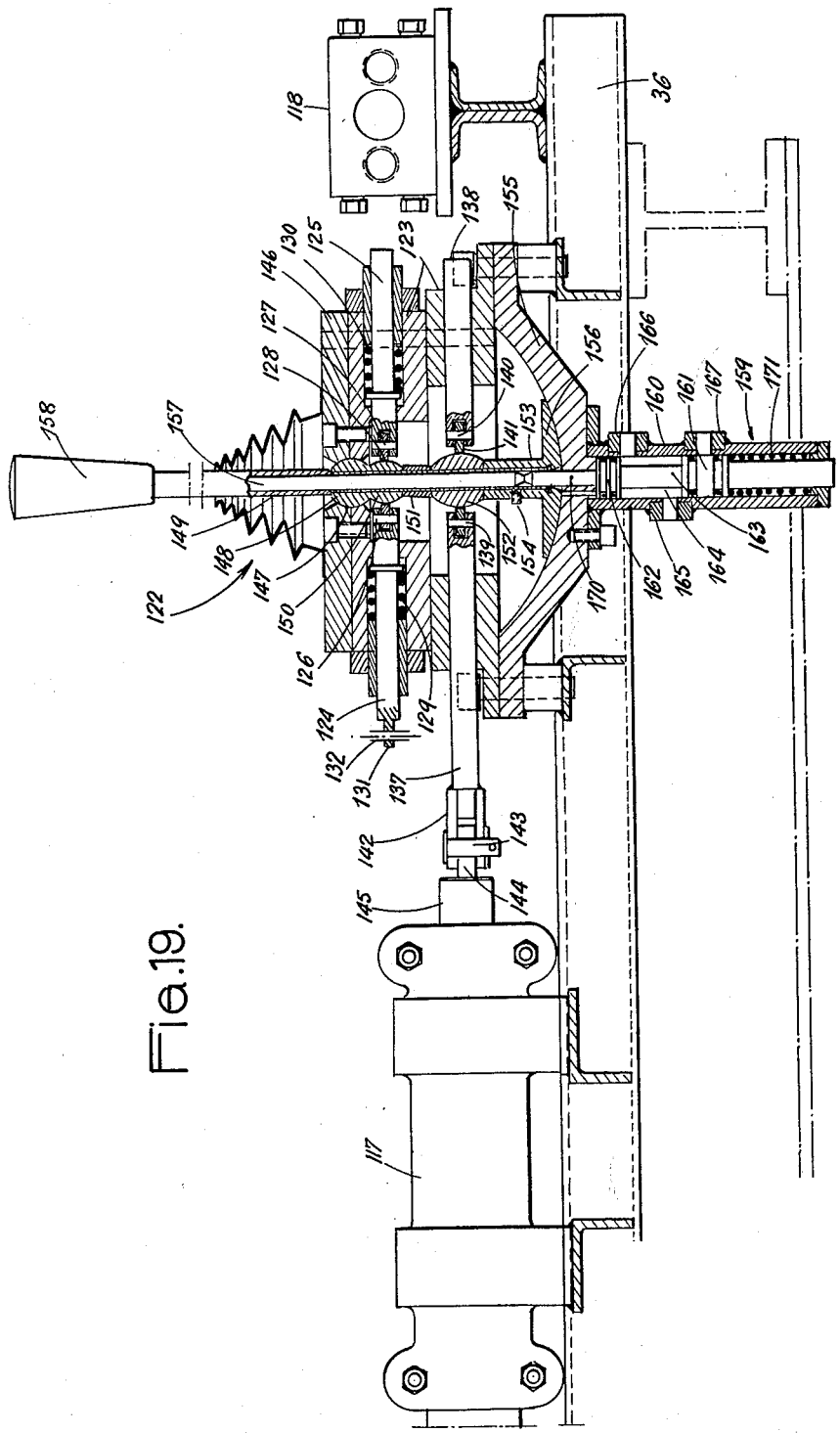
FIGURE 19 is a section taken, in the lower part, through the line XIX—XIX of FIGURE 18 and, in the upper part, through the line XIXA—XIXA of the same figure.

The control means for the speed distributor 116 are independent, while the control means for the speed and steering distributors 117 and 118 comprise a common selector device 122 which is illustrated in detail in FIGURES 18 and 19. The device 122 comprises a hollow support 123 wherein are slidably mounted two rods 124 and 125 which are pivotally connected to two shafts 126, 127 extending through a plate 128 embodying an elongated aperture 128₁ directed at right angles to the direction of said rods. The rods 124 and 125 are subjected to the action of elastic means 129 and 130 which, by their mutually opposed forces, urge the plate 128 into the equilibrated substantially midway position shown in FIGURE 19. The rod 124 is extended by a flattened portion 131, and this portion is fitted with a pin 132 which engages in slots provided in two parallel levers 133 which are fulcrumed in their middle about a pin 134 fitted to a lug 135 integral with the structure 123. The other ends of the levers 133 are connected to a slide-valve 136 of the distributor 118, in the same manner as to the rod 124.

In the structure 123 are likewise slidably mounted, though in an orthogonal direction, two further rods 137 and 138 pivoted about pins 139 and 140 extending through a plate 141 which embodies an elongated aperture 141₁ directed at right angles to the direction of said rods. The rod 137 is extended by a clevis 142 which is provided with a pin 143 extending through an eye 144 formed at the extremity of a slide-valve 145 of distributor 117. The structure 123 and a cover 146 thereon jointly form a socket 147 for a ball joint 148 threaded over a tube 149. The tube 149 also extends through a swivel 150 disposed in the aperture 128₁ of the plate 128 controlling the rods 124, 125, then through a spacer 151 and a swivel 152 placed in the elongated aperture 141₁ of the plate 141 controlling the rods 137, 138, and lastly through a sleeve 153 which is secured by a screw 154 to said tube 149 with a view to tightening the stacked components hereinbefore described against a shoulder on said tube.

The structure 123 is affixed to the cross member 36 of the chassis 1 and imprisons a spherical cup 155 centered upon the pivot 148. The sleeve 153 which terminates the tube 149 is provided with a projecting spherical shoe 156 which reposes upon the cup 155, the angular aperture of the spherical surface of said shoe being at least equal to the maximum rotational amplitude of the tube 149 relative to the pivot 148. A control lever 157 provided with an extension in the form of an operating handle 158 is slidably mounted in said tube 149 and is subjected to spring means urging it into the position shown in FIGURE 19.

The selective control device 122 of distributors 117 and 118 also controls a braking distributor 159 adapted to halt the carriage instantly when the driver releases the lever 157, thereby causing the same to return to its position of equilibrium (see FIG. 19). Distributor 159 thus constitutes a special safety feature, by reason of the fact that the carriage cannot be moved unless the driver is at his driving station, in proximity to which said lever 157 is located.

The distributor 159 comprises a cylinder 160 which is affixed beneath the cup 155 in such manner as to be aligned with the lever 157 when the same is in its position of equilibrium. Two pistons 161, 162 which are interconnected by a rod 163 and slidably mounted in the cylinder 160, bound within the same an annular chamber 164 which places a pipe 165 in communication either with a pipe 166 or with a pipe 167, according as said pistons occupy the one or the other of their two terminal positions. From FIGURE 20 it may be seen that the pipe 165 of distributor 159 is connected through lines 159a and 159b to brake actuators 168 and 169 operating on the left and right hand side wheels 5, respectively; that the pipe 167 is connected, through a conduit 159c tapped off the line 43c to the delivery pipe of the pump 43 which continues to supply the motor 62 irrespective of the speed of the carriage when the same is in motion; and, lastly, that the pipe 166 is connected through a conduit 159d to the delivery tank 120.

The rod 163 of distributor 159 is furthermore extended by a locking peg 170 engaging into the cup 155. In response to elastic urging means 171, said peg 170 penetrates into the tube 149 and thrusts away the control lever 157 when the same is in its position of equilibrium (FIGURE 19), in which position the motors 62 and 63 are not supplied and the carriage is consequently stationary. In this position, the chamber 164 places lines 159a and 159b in communication with conduit 159d, thereby enabling the brake actuators 168 and 169 to discharge into tank 120, which in turn results in the wheels 5 being braked in the manner to be hereinafter described.

To start and manoeuvre the carriage, it is first necessary to thrust forward the lever 157 in order to fully disengage the peg 170 from the shoe 156, then to tilt the lever in whichever direction it is desired to move the carriage. The first phase of this operation results in the pistons 161 and 162 of distributor 159 being brought into their terminal positions, wherein they are retained by the shoe 156, against which said peg 170 abuts. As a result, the chamber 164 establishes communication between the lines 159a, 159b and the conduit 159c tapped off the line 43c, in order to enable the pump 43, which continuously delivers hydraulic fluid under pressure, to feed the actuators 168, 169 and thereby release the brakes operating on the side wheels 5. During the second part of the operation of lever 157, wherein the same is tilted in whichever direction it is desired to move the vehicle, the rods 124, 125 are caused to slide simultaneously in a lateral plane towards the left or the right, and the rods 137, 138 to side in a fore-and-aft plane, towards the front or the rear, to control the steering distributor 118 and the forward and reverse distributor 117, respectively.

From the foregoing it will be manifest that the selective control device 122 allows for starting, manoeuvring and stopping the carriage by means of the single lever 157, and also for halting the carriage instantly as soon as the driver releases the said lever.

Figure 17:
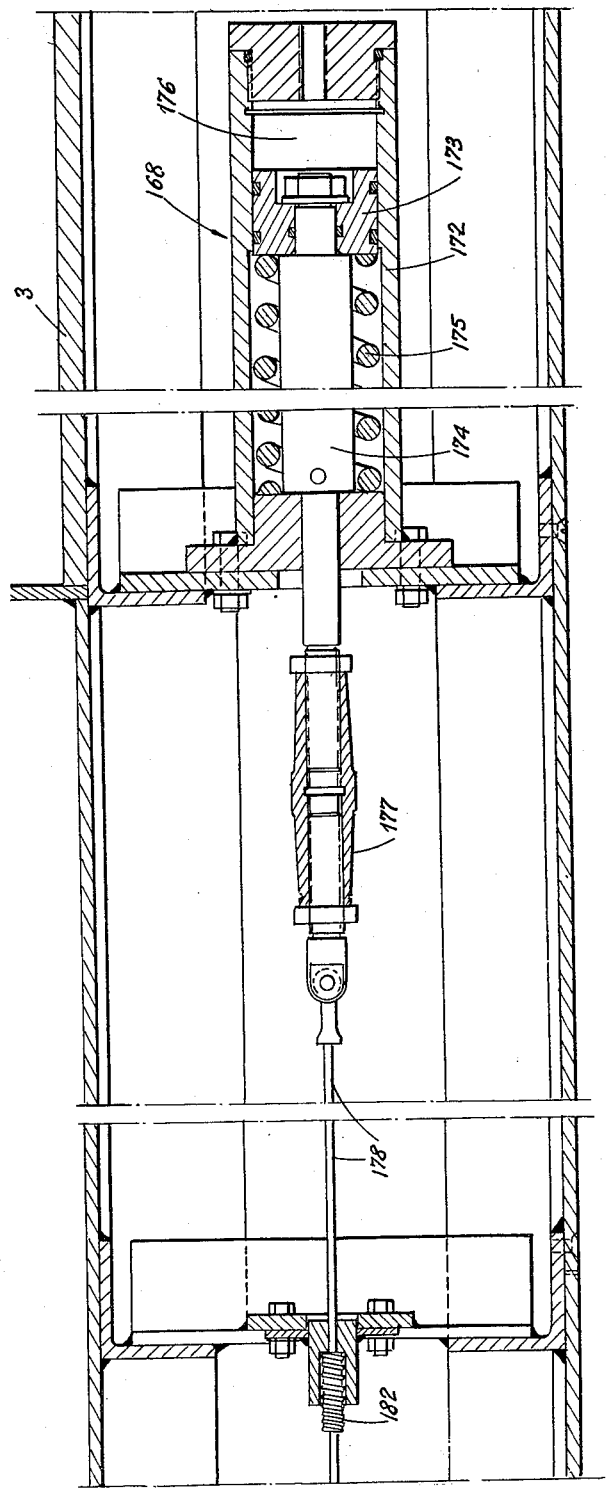

Each brake actuator 168 and 169 comprises a cylinder 172 which is closed at both ends and affixed to the corresponding side member 3 (or 2) of the chassis 1 (see FIGURE 17). A piston 173, which is rigidly connected to a rod 174 extending through one of the end faces of the cylinder, is slidably mounted in said cylinder and is subjected to the opposing forces exerted, on the one hand, by an elastic means 175 tending to provoke application of the brakes and, on the other, by the hydraulic fluid which is delivered into a chamber 176 through the corresponding line 159a (or 159b) and which tends to provoke the release of said brakes. The remote projecting end of rod 174 is connected through the medium of a turnbuckle 177 to a cable 178 for controlling application of the brake shoes 179, 180 (FIGURE 15), which brake shoes are fitted with linings co-operating with a drum formed by the rim 7 of the corresponding wheel 5 and are supported by a flange 181 secured to the pivotal arm 12, concentrically with the axle 11. The cable 178 extends through a flexible metal sheath 182 interposed between the chassis 1 and the flange 181. The purpose of the turnbuckles 177 is to adjust and balance the brakes on the wheels 5. These turnbuckles also allow for releasing the brakes, to allow the carriage to be moved independently of the means provided for the purpose, particularly in the event of a failure in the hydraulic circuitry, in which case the effect of the elastic means 175 associated to actuators 168 and 169 would become preponderant and maintain the brakes applied.

Figure 20:
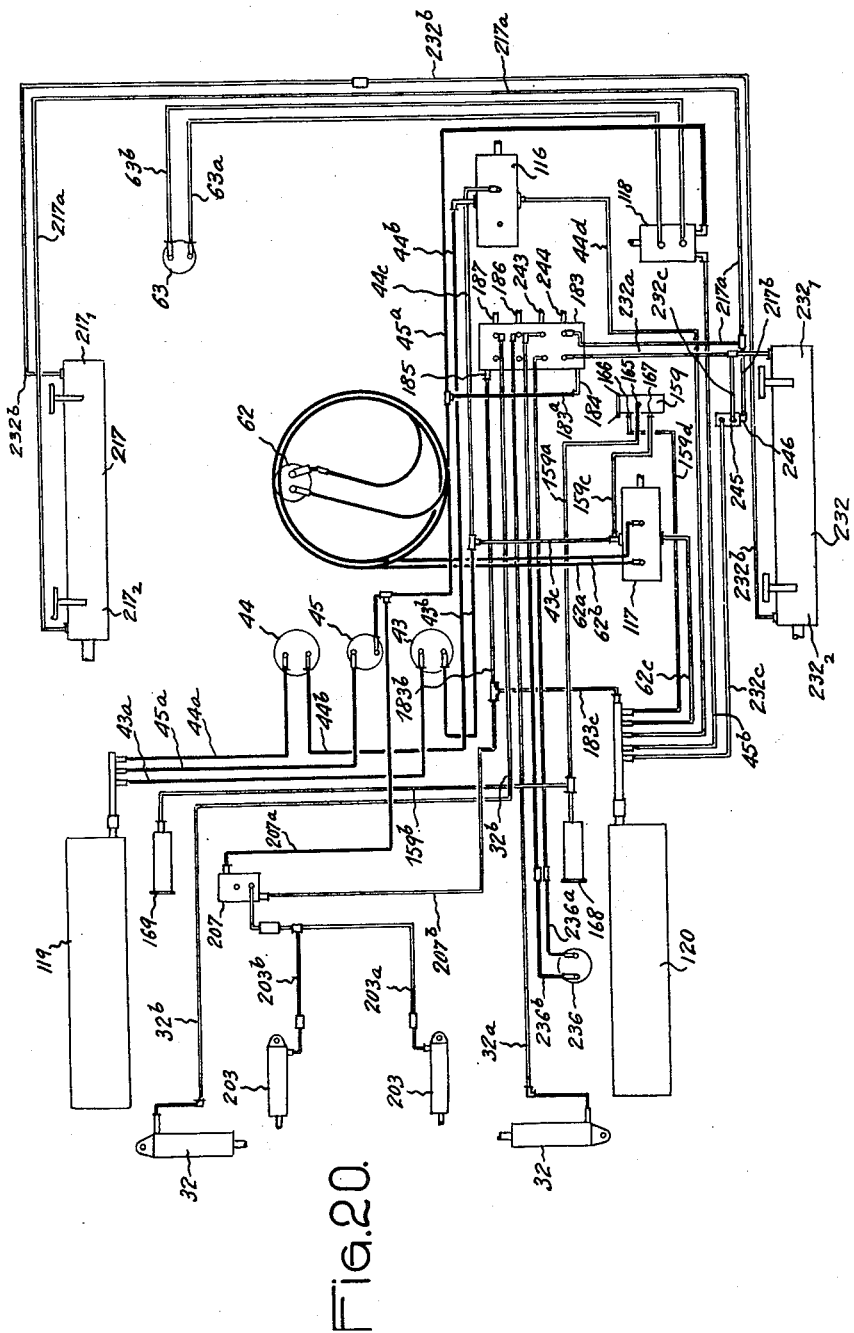
FIGURE 20 shows the hydraulic circuitry of the carriage.

The cross member 36 of the chassis 1 additionally supports, in proximity to the driver's station, a further distributor 183 of which an input pipe 184 is connected, through a line 183a tapped off the line 45a, to the delivery pipe of the pump 45, and of which an outgoing pipe 185 is connected through conduits 183b and 183c to the delivery tank 120 (see FIGURE 20). A sleeve valve 186 of said distributor 183 allows communication to be established between a line 32a connected to the left-hand stabilizing jack 32 and either the input pipe 184— to cause this jack to be filled and the left-hand side of the chassis to be raised—or the delivery pipe 185—to cause said jack to drain into the tank 120 and the left-hand side of the chassis to be lowered until the stops 18, 19 of said chassis abut against the pivotal arms 12, 13. Similarly, a sleeve valve 187 enables communication to be established between a line 32b connected to the right-hand stabilizing jack 32 and either the input pipe 184 or the outgoing pipe 185, to provoke raising or lowering, respectively, of the right-hand side of the chassis 1.

With the means resorted to, as hereinbefore described, there is provided a prefectly reliable tractive vehicle which is very easy to drive and which is furthermore centralized to allow a single operator to control forward or reverse travel, at high or low speed, left-hand or right-hand turns, braking and immobilization of the vehicle, followed by stabilization of the same to ensure that its chassis 1 is horizontal in the transverse direction at least.

The chassis side members 2, 3 are additionally provided with means for loading, conveying and unloading a reel, regardless of the size or capacity of the same, as well as with means for paying off the cable. At the entrance of the gap 4, the side members 2 and 3 support two retractable overhanging rollers 188 and 189 the positions of which can be adjusted to suit the spacing of the flanges forming the rolling rims of the reel (see FIGURES 1, 2 and 4).

Each roller 188 (or 189) (FIGURES 13 and 14) is freely rotatable on an axle 190 associated to bearings 191 and is slidably mounted in a sleeve 192. The said axle is drilled with two holes 193 into which may be selectively inserted a locking pin 194 which extends through the sleeve to retain the roller 188 (189) in either of its extreme lateral positions (see FIGURE 2) on the member 2 for a minimum reel width or on the member 3 for a maximum reel width. The rollers are provided with a projecting retaining rim 195 and the axles 190 are integral with an operating draw-link 196.

The sleeve 192 is provided with two flanges 197 which are set astride a lug 198 on the corresponding chassis member 2 (or 3) and which are pivotally mounted on a pin 199 of said lug. The sleeve is likewise rigid with a clevis 200 articulated onto a pin 201 which extends through one of the flattened extremities of a plunger 202 associated to a raising jack 203 of which a cylinder 204 is in turn articulated onto a pin 205 on the chassis. When this jack is actuated, it tends to cause the sleeve 192 and the roller 188 (or 189) it carries to pivot in the direction of the arrow F, from the conveying position shown in solid lines, in which position said sleeve reposes on stops 206, towards the position wherein the roller retracts, which position is shown in broken lines. To this end, the jacks 203 which raise the left-hand roller 189 and the right-hand roller 188 are connected, through the medium of lines 203a and 203b respectively, to a distributor 207 the input pipe of which is connected, through a line 207a tapped off the line 45a, to the pump 45, and the outgoing pipe of which is connected, through a conduit 207b tapped off the conduit 183c, to the delivery tank 120 (see FIGURE 20). The hoisting distributor 207 is adapted to place the cylinders 204 of the left-hand and right-hand jacks 203 in simultaneous communication either with the pump 43 or with the tank 120, with a view to raising or lowering the rollers 188, 189.

Near the inner end of the gap 4, the chassis members 2, 3 support two rollers 208, 209 for raising and lowering the reel, each provided with two rolling tracks $208_1$, $208_2$ (or $209_1$, $209_2$) flanked by lateral retaining flanges 210 (see FIGURE 2). The tracks $208_1$, $209_1$ correspond to the minimum width (possessed by certain reels) and the tracks $208_2$, $209_2$ to the maximum width (possessed by other reels). Through the instrumentality of pins 211, said rollers 208 and 209 (FIGURES 2, 10, 11 and 12) are fixed to a shaft 212 extending crosswise at a level below that of the pins 190 of rollers 188, 189.

That extremity of shaft 212 which is associated to the roller 208 is freely rotatable in bearings 213 supported by a tubular housing 214 inserted into and retained in an eye 215 forming an extension of a piston rod 216 of a double-acting jack 217 which is firmly clamped to member 2 of the chassis 1. The housing 214 is rigid with a shoe 218 into which are cut two flat portions adapted to provide it with generous guiding surfaces for co-operation with two slideways 219, 220 fitted to the edges of an aperture 221 which is bounded by the inner wall of said member 2. The member 2 further comprises a bracket 222 adapted to retain the shoe in the slideways.

The other end of shaft 212 is engaged into a sleeve 223, on which the roller 209 equipped with bearings 224 is freely rotatable. The sleeve 223 is rigid with a structure 225 which is guided, in like manner to the shoe 218, in slideways 226 bordering an aperture 227 bounded by the inner wall of the chassis side member 3. The said structure is provided with a projecting clevis 228 which is articulated onto a pin 229 extending through an eye 230 forming an extension of a piston rod 231 associated to a double-acting jack 232 which is firmly clamped to side member 3. A reduction gear unit 233, which may be of the epicyclic type for instance, is fixed within the structure 225, in such manner as to permit its output shaft 234 to be inserted in and keyed coaxially to the shaft 218. Through the medium of an angle-piece 235, the casing of the reduction gear supports a rotary hydraulic motor 236 the shaft 237 of which extends through a bearing 238 in said angle-piece and is rigid with a sprocket 239. A further sprocket 240 is keyed to the reduction gear input shaft 241 and an endless chain 242 is meshed over the two sprockets 239, 240.

In consequence whereof, the shaft 212 is possessed of endwise motion by the co-operation of its two extremities with the slideways 219, 220 and 226 of the chassis members 2 and 3; it can furthermore be translated sideways, as will be hereinafter disclosed, towards the retractable rollers 188, 189, by means of the reel-hoisting lateral jacks 217, 232; lastly, it is rotatable, being driven by the motor 236 through the medium of the reduction gear 233, the chain 242, and the sprockets 240, 239.

The motor 236 is connected to the distributor 283 through the lines 236$a$ and 236$b$ (see FIGURE 20). A sleeve-valve 243 of this distributor allows connecting the line 236$a$ to the input pipe 184 supplied by the pump 45, and the line 236$b$ to the outgoing pipe 185 communicating with the delivery tank 120, in order to rotate the motor 236 in that direction which corresponds, say, to a cable-pay-off rotation of the reel supported by the rollers 188, 189, 208, 209; or which allows for cross connecting the lines and pipes hereinbefore enumerated, in order to rotate the motor 236 in the opposite direction and wind the cable into the reel; or else which allows for short-circuiting the lines 236$a$ and 236$b$, in order to stop the motor and immobilize the reel.

The jacks 217 and 232 are in series in the hydraulic circuitry, so as to be operated by the same quantity of pressurized fluid. Thus the jacks have identical strokes and the shaft 212 can be translated sideways. The raising chamber $232_1$ of jack 232 and the lowering chamber $217_2$ of jack 217 are connected through lines 232$a$ and 217$a$ to the distributor 183, which distributor comprises a slide valve 244 which either seals off said chambers or provides a direct or cross-connection therefrom to the input pipe 184 communicating with the pump 45 and to the output pipe 185 communicating with the delivery tank 120. The lowering chamber $232_2$ of jack 232 is connected to the raising chamber $217_1$ of jack 217 through a line 232$b$. In addition, a monitored non-return valve 245 is placed in series in a conduit 232$c$ tapped off line 232$a$ and leading into the delivery tank 120. This valve normally opposes the flow of hydraulic fluid towards the tank. It is controlled by a monitoring tap 246 which is connected, through a by-pass conduit 217$b$, to the line 217$a$, in order to provide a relief passageway when said line 217$a$ is under pressure and thereby increase the delivery section and hence restrict the pressure.

In a first position of sleeve valve 244, the line 232$a$ is connected to the input pipe 184 with a view to supplying hydraulic fluid under pressure from the pump 45 to the raising chamber $232_1$ of jack 232, the piston of which drives under pressure the fluid contained in the lowering chamber $232_2$ through the line 232$b$ towards the raising chamber $217_1$ of jack 217, the piston of which in turn drives the fluid contained in the lowering chamber $217_2$ towards the line 217$a$ which the sleeve-valve 244 connects to the output pipe 185 and thence to the tank 120, the monitored non-return valve 245 being prevented from being actuated. The jacks 217, 232 thus cause a crosswise translation of the shaft 212, and thereby tend to move the driving rollers 208 and 209 towards the loose rollers 188, 189, which in turn tends to raise the reel supported on these rollers.

In a second position of sleeve valve 244, the line 217$a$ is connected to the input pipe 184, with a view to supplying hydraulic fluid under pressure from the pump 45 to the lowering chamber $217_2$ of jack 217, the piston of which jack drives the fluid contained in raising chamber $217_1$ under pressure, through the line 232$b$, towards the lowering chamber $232_2$ of jack 232, the piston of which jack in turn drives out the fluid contained in the raising chamber $232_1$. The monitored non-return valve 245 is acted upon by the fluid under pressure reaching the tap 246 through the conduit 217$b$ tapped off the line 217$a$, and consequently opens up the conduit 232$c$ connecting the line 232$a$ to the delivery tank 120. The hydraulic fluid driven out of the raising chamber $232_1$ of jack 232 is thus conveyed towards said tank through the conduit 232$c$ and the line 232$a$ which the sleeve valve 244 places in communication with the output pipe 185 of distributor 183, which pipe is connected to said tank. In this way, the delivery section is increased and the fluid velocity limited. In this second position of the sleeve-valve 244, the jacks 217, 232 provoke a sideways translation of the shaft 212 and tend to move the driving rollers 208, 209 away from the loose rollers 188, 189, thereby causing the reel supported by these rollers to be deposited on the ground.

In a third position of sleeve valve 244, the lines 232$a$, 217$a$ are shut off, so that the jacks 217 and 232 are no longer supplied and therefore remain in the position they previously occupied.

To charge a reel on the carriage, the operator raises the rollers 188, 189 by operating on the distributor 207 which controls the supply to the jacks 203; he then moves the carriage, by resorting to the means described preceedingly, in such manner as to bring the chassis side members 2 and 3 on either side of the reel to be loaded, the carriage being manoeuvred to bring the rims of the reel in abutment against the rollers 208, 209. The operator then lowers the rollers 188, 189 by reversing the distributor 207 and stabilizes the chassis by operating the appropriate sleeve-valve 186, 187 of the distributor 183 which controls the supply to the lateral stabilizing jacks 32. Lastly, he raises the reel by operating on sleeve-valve 244 of distributor 283, thereby causing the chambers $232_1$ and $217_1$ of jacks 232 and 217 to be supplied in series. To pay off the cable from the reel, or to wind it in, the driver operates on sleeve-valve 243 of the distributor 183 controlling the supply to the rotary hydraulic motor 236, in order to cause the same to rotate the shaft 212 in the required direction.

To unload the reel, the loading operations hereinbefore described are carried out in reverse order.

While there has been described and illustrated, the presently preferred embodiment of the cable reel handling and displacing carriage of this invention, it will be well understood by those skilled in the art that many substitutions of parts and modifications may be made without departing from the scope of the invention. By way of example, the control devices utilized for the various functions may be powered by means other than the hydraulic means referred to, examples being mechanical, electrical, electronic, pneumatic, or like means.

I claim:

1. A carriage, for lifting, transporting and rotating cable reels, comprising, in combination, a chassis U-shape in plan and including a pair of laterally spaced and relatively elongated side members interconnected at one end by a cross member, said side members being arranged to have a cable reel supported therebetween with its axis transverse to said side members; a steering platform supporting said cross member and rotatable relative thereto about a substantially vertical axis; a steering and driving wheel rotatably mounted on and supporting said platform; driving means connected to said steering and driving wheel to rotate the latter; a pair of freely rotatable support wheels each rotatably mounted in a respective support; means mounting each support on a respective side member adjacent the free end of the latter for vertical adjustment of each support wheel relative to its associated side member; a pair of first reel support rollers each mounted on the free end of a respective side member on the inner side thereof for movement between a reel-engaging position, in which said first rollers are axially aligned transversely of the side members to engage the rims of a reel between said side members, and a retracted position in which said first rollers are swung out of the way to provide for entry of a reel between said side members; a pair of second reel support rollers secured in axially spaced relation to an axle extending transversely of said side member inwardly of said first rollers; and means selectively operable to adjust said axle longitudinally of said side members; whereby, when a reel has been entered between said side members with said first rollers in a retracted position and said first rollers thereafter moved to the reel-engaging position, said second rollers may be moved towards said first rollers to engage the rims of the reel and, acting conjointly with said first rollers engaged with the reel rims, to lift the reel.

2. A carriage, as claimed in claim 1, including driving means connected to said axle to rotate same to rotate a reel supported on said reel support rollers.

3. A carriage, as claimed in claim 1, including stabilizing means mounted on said chassis and cooperable with said support wheels and their respective supports to lift said chassis relative to said support wheels.

4. A carriage, as claimed in claim 1, including a prime mover supported on said cross member; a supply of hydraulic fluid; a plurality of pumps driven by said prime mover and connected to said supply; said driving means comprising a hydraulic motor; control means selectively operable to connect either one pump or two pumps to said hydraulic motor; a steering hydraulic motor connected to said steering platform to rotate the same selectively in either direction; and means selectively operable to connect one of said pumps to said steering hydraulic motor for selective rotation of said steering platform in either direction.

5. A carriage, as claimed in claim 4, including a circular track on said cross member; said steering platform being rotatably supported on said track; and a reduction gear unit and torque limiting means connected, in series, between said steering hydraulic motor and said steering platform.

6. A carriage, as claimed in claim 5, said reduction gearing comprising a planetary gearing having an input gear connected to said torque limiting means and an output gear connected to said steering platform; and planet gearing interconnecting said input gear and said output gear.

7. A carriage, as claimed in claim 4, including a sprocket fixed coaxially to said steering platform; a drive sprocket connected to said steering hydraulic motor; an endless chain interconnecting said sprockets; and means securing a portion of said chain to said first named sprocket.

8. A carriage, as claimed in claim 4, including three fluid distributing means on said chassis; one of said distributing means controlling operation of said hydraulic motor driving means, a second controlling operation of said steering hydraulic motor and the third being selectively operable to connect either one pump or two pumps to a selected one of said hydraulic motors.

9. A carriage, as claimed in claim 8, including a control lever mounted for universal movement and operatively connected to said first and second fluid distributing means whereby, upon movement of said lever in a selected direction, said carriage may be driven forwardly or reversely or steered to the right or to the left all through the movement of said single lever.

10. A carriage, as claimed in claim 9, including braking means operable to stop motion of said carriage; means biasing said braking means to the braking position; means biasing said control lever to a neutral position; means operable, responsive to movement of said control lever from its neutral position, to release said braking means; and fail-safe control means operable, responsive to movement of said control lever to its neutral position, to interrupt the supply of hydraulic fluid to said braking means, for biasing of said braking means to the braking position.

11. A carriage, as claimed in claim 10, in which said control lever comprises a control rod movable longitudinally of a control sleeve; a guide shoe on the inner end of said control sleeve having a substantially spherical outer bearing surface; guiding means having a substantially spherical inner guiding surface cooperable with said guide shoe; said fail-safe means comprising a piston and cylinder valve controlling supply of hydraulic fluid to said braking means; said piston having a stem extending through an aperture in said guiding means and engageable in said sleeve when said lever is in the neutral position to engage said rod; means biasing said piston in a direction to engage said stem within said sleeve, said piston thereupon interrupting supply of hydraulic fluid to said braking means; said rod being movable inwardly to displace said stem out of said sleeve and said guide shoe to permit substantially universal movement of said control lever from the neutral position.

12. A carriage, as claimed in claim 4, each of said first support rollers being rotatable upon a respective axle; each of said last-named axles being pivoted to an associated side member of said chassis; hydraulic actuator means connected to each of said last-named axles, each hydraulic actuator means being operable to swing the associated axle to said retracted position; and control means connected to one of said pumps and to said hydraulic actuators and selectively operable to control operation of said actuators to move said first support wheels between said reel-engaging and retracted positions.

13. A carriage, as claimed in claim 4, each of said side members being formed with longitudinally extending trackways; a pair of slides, each mounted in one of said trackways; said slides conjointly supporting said transversely extending axle for said second reel support rollers; a pair of hydraulic actuators, each operatively connected to one of said slides; means interconnecting said hydraulic actuators for conjoint operation; selector means connected between the third of said pumps and said hydraulic actuators and selectively operable to operate said actuators to shift said transversely extending axle longitudinally of said side members; a by-pass hydraulic fluid circuit interconnecting said actuators; and a monitored one-way valve in said by-pass circuit.

14. A carriage, as claimed in claim 4, including a hydraulic motor operable to rotate said transversely extending shaft to rotate a supported reel; a pair of slides mounted in trackways in said side members rotatably supporting said shaft; a reducing gearing unit; said hydraulic motor and said reduction gearing unit being mounted on one of said slides; and control means interconnecting one of said pumps and said hydraulic motor for selective rotation of said transversely extending shaft in either direction.

15. A carriage, as claimed in claim 3, each of said supports for said support wheels comprising a crank member pivoted at the intersection of its arms to the associated side member; a pair of hydraulic actuators, each pivotly secured at one end to a respective one of said side members; each support wheel being rotatably mounted in one end of its associated crank member; a pair of clamping members, each pivotly connected to the opposite end of a respective crank member; means pivotally connecting each crank member to a respective one of said actuators for movement by the latter into clamping engagement with the associated support wheel; whereby, upon operation of said actuator to clamp the clamp member against the associated support wheel, the associated crank member will be swung in a direction to lift its associated side member away from the associated support wheel.

References Cited in the file of this patent

UNITED STATES PATENTS

| | | |
|---|---|---|
| 2,690,269 | Bill | Sept. 28, 1954 |
| 2,735,717 | Harman | Feb. 21, 1956 |
| 2,759,682 | Garnett | Aug. 21, 1956 |
| 2,913,194 | Garnett | Nov. 17, 1959 |
| 2,958,478 | Petersen et al. | Nov. 1, 1960 |
| 2,991,024 | Goode | July 4, 1961 |